(12) United States Patent
Zhang

(10) Patent No.: US 9,131,567 B2
(45) Date of Patent: Sep. 8, 2015

(54) TEMPERATURE FOLDBACK CIRCUIT FOR LED LOAD CONTROL BY CONSTANT CURRENT SOURCE

(71) Applicant: Marvell World Trade Ltd., St. Michael (BB)

(72) Inventor: Wanfeng Zhang, Palo Alto, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

(21) Appl. No.: 14/050,284

(22) Filed: Oct. 9, 2013

(65) Prior Publication Data

US 2014/0111090 A1    Apr. 24, 2014

Related U.S. Application Data

(60) Provisional application No. 61/716,721, filed on Oct. 22, 2012.

(51) Int. Cl.
*H05B 37/00* (2006.01)
*H05B 41/00* (2006.01)
*H05B 33/08* (2006.01)

(52) U.S. Cl.
CPC ........ *H05B 33/0815* (2013.01); *H05B 33/0824* (2013.01); *H05B 33/0848* (2013.01); *Y02B 20/347* (2013.01)

(58) Field of Classification Search
None
See application file for complete search history.

(56) References Cited

U.S. PATENT DOCUMENTS

| | | | |
|---|---|---|---|
| 4,743,897 A * | 5/1988 | Perez | 345/212 |
| 6,870,328 B2 * | 3/2005 | Tanabe et al. | 315/291 |
| 8,410,720 B2 * | 4/2013 | Holec et al. | 315/294 |
| 2009/0289559 A1 | 11/2009 | Tanaka et al. | |
| 2010/0134018 A1 | 6/2010 | Tziony et al. | |
| 2011/0068701 A1 * | 3/2011 | van de Ven et al. | 315/185 R |
| 2011/0273102 A1 * | 11/2011 | van de Ven et al. | 315/193 |
| 2011/0316432 A1 | 12/2011 | Lee | |

FOREIGN PATENT DOCUMENTS

KR   10-1007034 B1   1/2011
KR   10-2012-0114998 A   10/2012

OTHER PUBLICATIONS

International Search Report and Written Opinion for PCT/US2013/064178, filed on Oct. 9, 2013.

* cited by examiner

*Primary Examiner* — Anh Tran

(57) ABSTRACT

An apparatus includes an input node, a light-emitting diode (LED) string to receive a current from the input node, a voltage divider to output a control voltage, and a switch to receive the control voltage. The switch coupled to the LED string controls the current through the LED string according to the control voltage.

20 Claims, 7 Drawing Sheets

TEMPERATURE FOLDBACK CIRCUIT FOR LED LOAD CONTROL BY CONSTANT CURRENT SOURCE

CROSS REFERENCE TO RELATED APPLICATION

This present disclosure claims the benefit of U.S. Provisional Application No. 61/716,721 "TEMPERATURE FOLDBACK CIRCUIT FOR LED LOAD CONTROL BY CONSTANT CURRENT SOURCE," filed on Oct. 22, 2012, which is incorporated by reference herein in its entirety.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Light emitting diodes (LED) are/have been popular in electronic device applications, for instance, indicator applications, displays of laboratory instruments, and illumination applications. An LED string that includes a plurality of LEDs connected to each other, utilizes a direct current (DC) flowing thorough the LEDs for operation.

When the DC current flows through the LED string, a power comprising the product of the string forward voltage and the DC current is dissipated from the LED string.

SUMMARY

In an embodiment of the disclosure, an apparatus includes an input node, a light-emitting diode (LED) string to receive a current from the input node, a voltage divider to output a control voltage, and a switch to receive the control voltage. The switch coupled to the LED string controls the current through the LED according to the control voltage.

In an embodiment of the disclosure, a method performs supplying a current from an input node to an LED string including a first portion and a second portion, outputting a control voltage from a voltage divider to a switch to control the switch, and controlling the current through the LED string according to the control voltage.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

An LED system may experience high temperature from power dissipation, which may reduce a lifetime of LEDs therein. When the temperature of the LED system exceeds a threshold temperature, a temperature foldback circuit may be employed to reduce a current through the LEDs while continuing to operate an LED system. Since the temperature of the LED system is maintained below the threshold temperature, the LED system may be protected. In an embodiment, the threshold temperature is predetermined.

Figure 1:
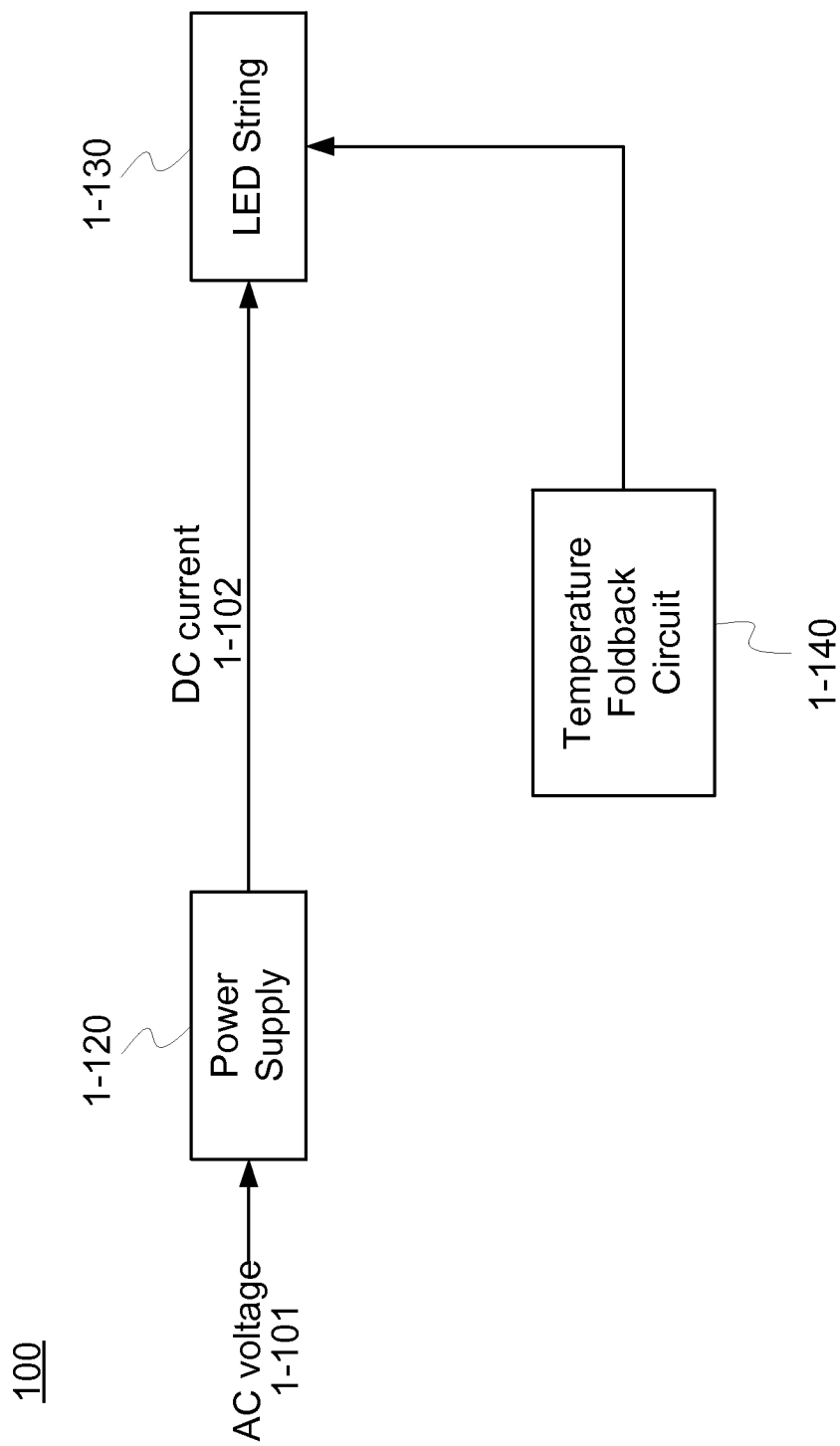
FIG. 1 is a block diagram of an LED system having a power supply, an LED string, and a temperature foldback circuit in accordance with an embodiment.

FIG. 1 is a block diagram of an LED system 100 having a power supply, an LED string, and a temperature foldback circuit in accordance with an embodiment. Referring to FIG. 1, the LED system 100 includes a power supply 1-120, an LED string 1-130, and a temperature foldback circuit 1-140.

The power supply 1-120 receives an incoming AC input voltage from an AC power supply 1-101 and converts the AC input voltage into a DC current 1-102. The DC current 1-102 is maintained at a substantially constant level to operate the LED string 1-130.

The LED string 1-130 includes a plurality of LEDs coupled to each other and each LED converts a current into light. In an embodiment, the DC current 1-102 flows through the plurality of LEDs, each of which is connected in series in the LED string.

In this embodiment, the light emitted by the LEDs in the LED string 1-130 is proportional to the number of recombinations between minority and majority carriers in the LEDs, which in turn is proportional to the DC current 1-102 through the LEDs. Thus, the DC current 1-102 may increase to increase amount of the light emitted by the LED string 1-130.

When the DC current 1-102 increases, since the power dissipated by the LED string 1-130 corresponds to the product of the string forward voltage and the DC current 1-102, the dissipated power also increases. Due to the increased power dissipation, a temperature of the LED system 100 may become higher than a threshold temperature at or above which the lifetime of the LED string 1-130 would be reduced.

When the temperature of the LED system 100 is higher than the threshold temperature, the temperature foldback circuit 1-140 operates to control the DC current flowing through the LED string 1-130. In an embodiment, the temperature foldback circuit 1-140 controls the DC current 1-102 such that the DC current 1-102 does not flow through at least one of the LEDs in the LED string 1-130.

Since the DC current 1-102 flows through a decreased number of the LEDs in the LED string, the power dissipation from the LED string 1-130 is decreased. As a result, the temperature of the LED system 100 becomes lower than the threshold temperature.

Figure 2:
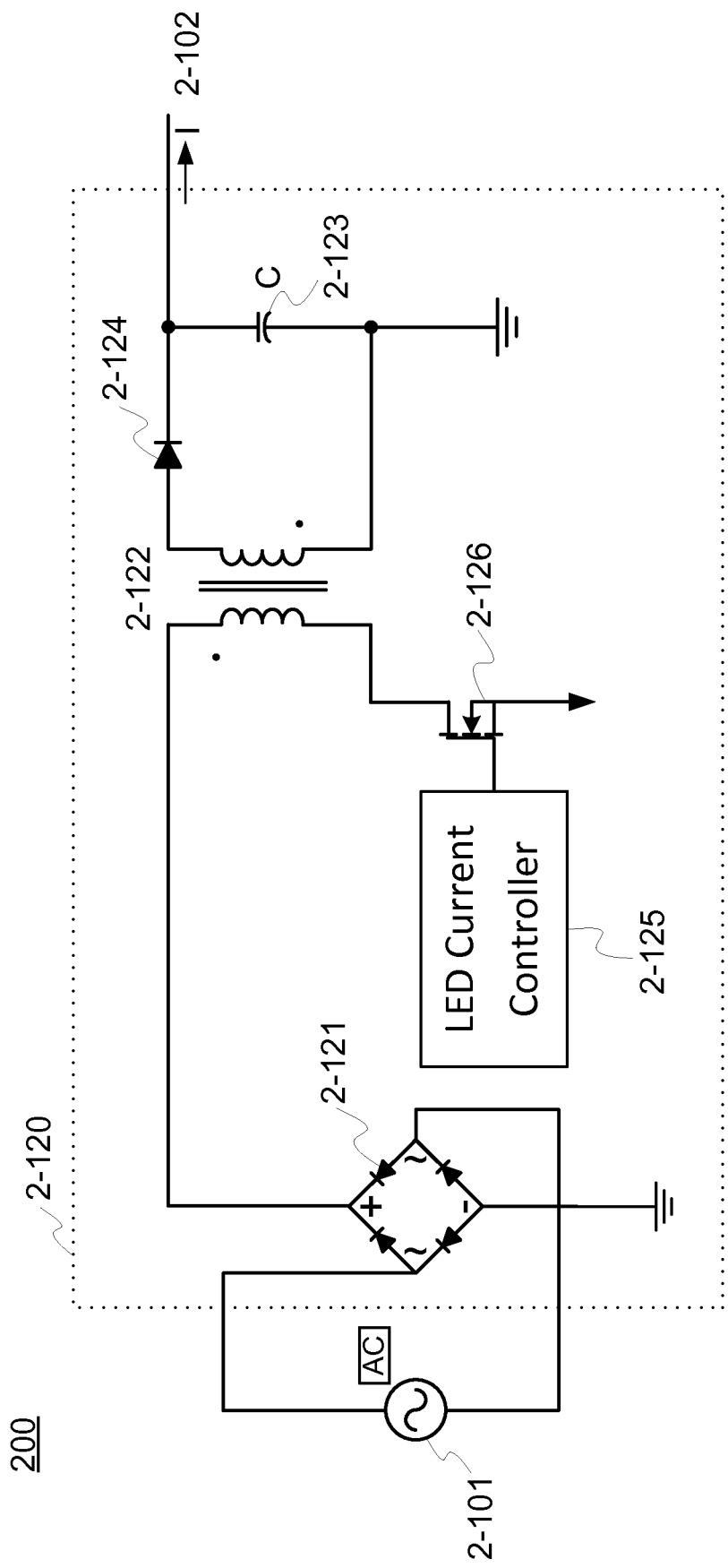
FIG. 2 is a diagram of a power supply that includes a power converter and an LED current controller in accordance with an embodiment.

FIG. 2 is a diagram of a power supply 200 that includes a power converter and an LED current controller in accordance with an embodiment. In this embodiment, the power supply 2-120 receives an AC signal from an AC power supply 2-101 and outputs a DC current 2-102 to an LED string 3-130 (see FIG. 3) or 4-130 (see FIG. 4).

In an embodiment, the power supply 2-120 includes a bridge rectifier 2-121 that inverts the negative halves of the received AC signal to generate a rectified AC signal. In other embodiments, a different type of full-wave rectifier may be used. One possible example is a rectifier including two diodes and a center tapped transformer.

The rectified AC signal is applied to the primary winding of a power converter 2-122. In an embodiment, the power converter 2-122 is an AD/DC flyback converter, which is controlled by an LED current controller 2-125 to provide the DC current 2-102.

Figure 3:
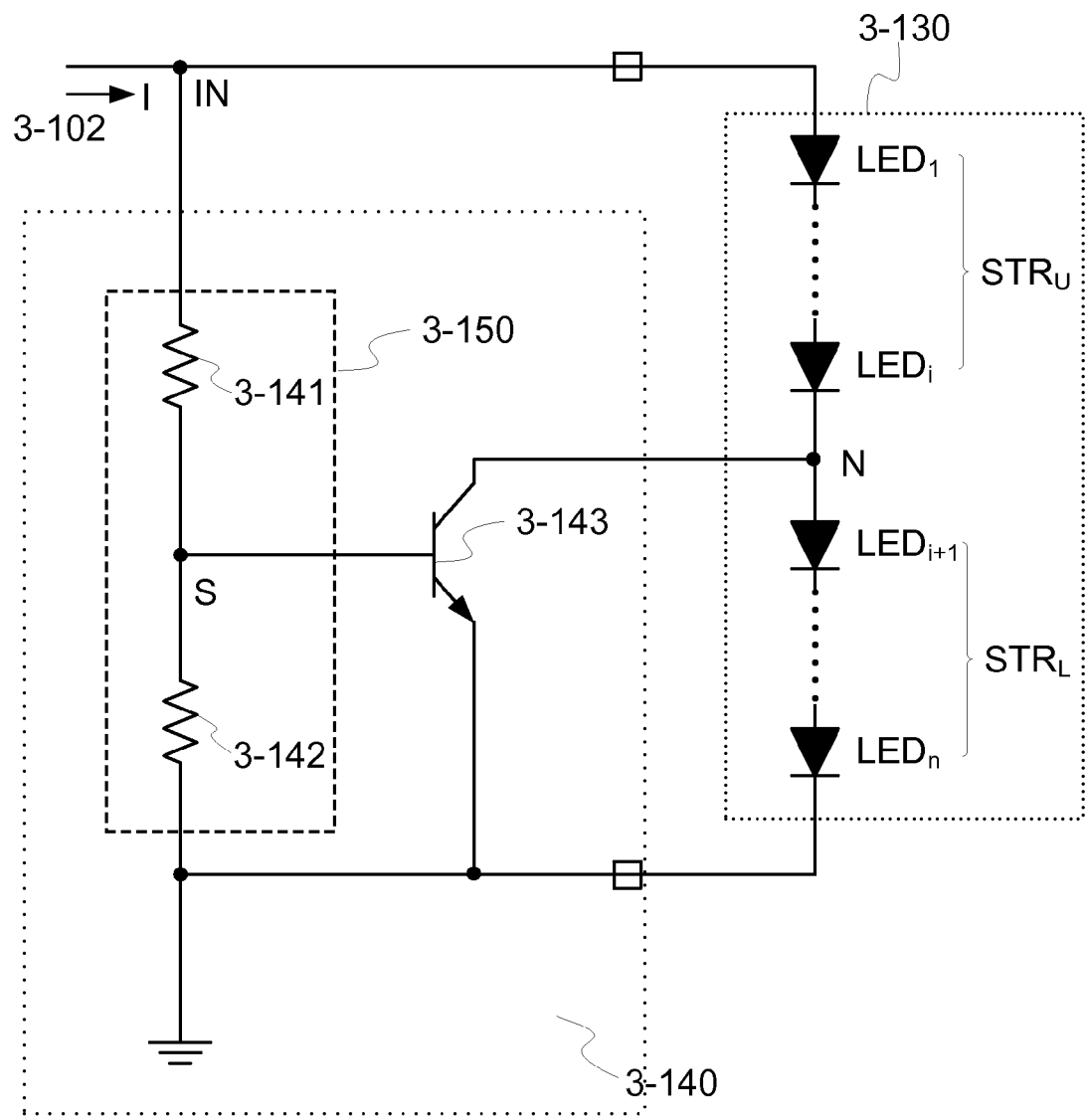
FIG. 3 is a diagram of a temperature foldback circuit and an LED string in accordance with an embodiment.

FIG. 3 is a diagram of a temperature foldback circuit 3-140 and an LED string 3-130 in accordance with an embodiment. The temperature foldback circuit 3-140 of this embodiment includes two resistance elements 3-141 and 3-142 and a switch 3-143.

In an embodiment, the switch 3-143 is an NPN transistor. In this embodiment, a collector of the NPN transistor 3-143 is coupled to the node between the first and second portions $STR_U$ and $STR_L$, so that the DC current 3-102 flowing through the first portion $STR_U$ bypasses to the ground through the NPN transistor 3-143 when the NPN transistor 3-143 is turned on.

The NPN transistor 3-143 is turned on when a voltage applied to a base of the NPN transistor 3-143 is higher than a threshold level. As discussed above, when the temperature of the LED system is higher than the threshold temperature, the applied voltage to the base of the NPN transistor 3-143 becomes sufficiently high to turn on the NPN transistor 3-143, thereby reducing the temperature of the LED system.

A level of the applied voltage to the base of the NPN transistor 3-143 is determined by a voltage divider 3-150 including the first and second resistance elements 3-141 and 3-142. The level of the applied voltage to the base increases in proportion to a ratio of the resistance value of the second resistance element 3-141 over the total resistance value of the voltage divider including both of the resistance elements 3-141 and 3-142.

In an embodiment, the first resistance element 3-141 is a resistor having negative temperature coefficient (NTC) characteristic and the second resistance element 3-142 has a substantially constant resistance value. In this embodiment, as a temperature of the resistance elements 3-141 and 3-142 increases, the resistance value of the first resistance element 3-141 is decreased while that of the second resistance element 3-142 remains substantially constant.

As a result, a voltage across the first resistance element 3-141 is decreased, and a voltage across the second resistance element 3-142 is increased. Since one end of the second resistance element 3-142 is connected to the ground, the voltage level at the other end of the second resistance element 3-142 (e.g., an output node S) that is applied to the base of the NPN transistor 3-143, is also increased.

In an embodiment, the temperature of the resistance elements 3-141 and 3-142 is substantially the same as the temperature of the LED string 3-130. Thus, when the temperature of the LED string 3-130 becomes higher than the threshold temperature, the temperature of the resistance elements 3-141 and 3-142 is increased so that the voltage level applied to the base becomes sufficiently high to turn on the NPN transistor 3-143.

In another approach, the first resistance element 3-141 has a substantially constant resistance value and the second resistance element 3-142 is a resistor having positive temperature coefficient (PTC) characteristic. In this embodiment, as the temperature of the resistance elements 3-141 and 3-142 increases, the resistance value of the second resistance element 3-142 is increased while that of the first resistance element 3-141 remains constant. Since a voltage across the second resistance element 3-141 is increased, the voltage level at the output node S that is applied to the base of the NPN transistor 3-143 is increased. When the temperature of the LED string 3-130 becomes higher than the threshold temperature, the voltage level applied to the base becomes sufficiently high to turn on the NPN transistor 3-143.

When the NPN transistor 3-143 is turned on, a DC current 3-102 that has flowed through both portions $STR_U$ and $STR_L$ of the LED string 3-130, bypasses from the node N through the switch 3-143 to the ground. A reduction of power dissipated from the LED string 3-130 by using the bypassing through the NPN transistor 3-143, is now explained.

The DC current 3-102 from the power supply 2-120 (see FIG. 2) is provided to an LED string 3-130 through an input node IN. When the DC current 3-102 flows through the LED string 3-130, a power that is the product of the string forward voltage of the LED string 3-130 and the DC current 3-102, is dissipated from the LED string 3-130.

Since the string forward voltage is proportional to a number of LEDs in the LED string 3-130 through which the DC current 3-102 flows, the amount of dissipated power is also proportional to the number of these LEDs. Thus as the number of LEDs through which the DC current 3-102 flows is decreased, the amount of dissipated power would be decreased.

In order to decrease the number of LEDs through which the DC current 3-102 flows, the switch 3-143 is coupled to a node N between two LEDs ($LED_i$ and $LED_{i+1}$) in the LED string 3-130 to bypass the DC current from the node N to ground. As a result, the DC current flows through a first portion $STR_U$ of the LED string 3-130 to the switch 3-143, instead of flowing through a second portion $STR_L$ of the LED string 3-130.

When the first portion $STR_U$ includes i number of LEDs ($LED_1$ to $LED_i$) and the second portion $STR_L$ includes (n–i) number of LEDs ($LED_{i+1}$ to $LED_n$), the amount of dissipated power is reduced as follows:

$$\text{dissipated power after bypassing} = \text{dissipated power before bypassing} \times \frac{i}{n}.$$

For example, when the first portion $STR_U$ includes two LEDs and the second portion $STR_L$ includes eight LEDs, the amount of dissipated power from the LED string 3-130 would be reduced to 20% (=100%*2/10) of that of originally dissipated power.

Since the amount of dissipated power from the LED string 3-130 is reduced, the temperature of the LED string 3-130 is decreased. When the temperature of the LED string 3-130 becomes lower than the threshold temperature, the switch 3-143 is automatically turned off to stop operating the temperature foldback circuit 3-140.

Figure 4:
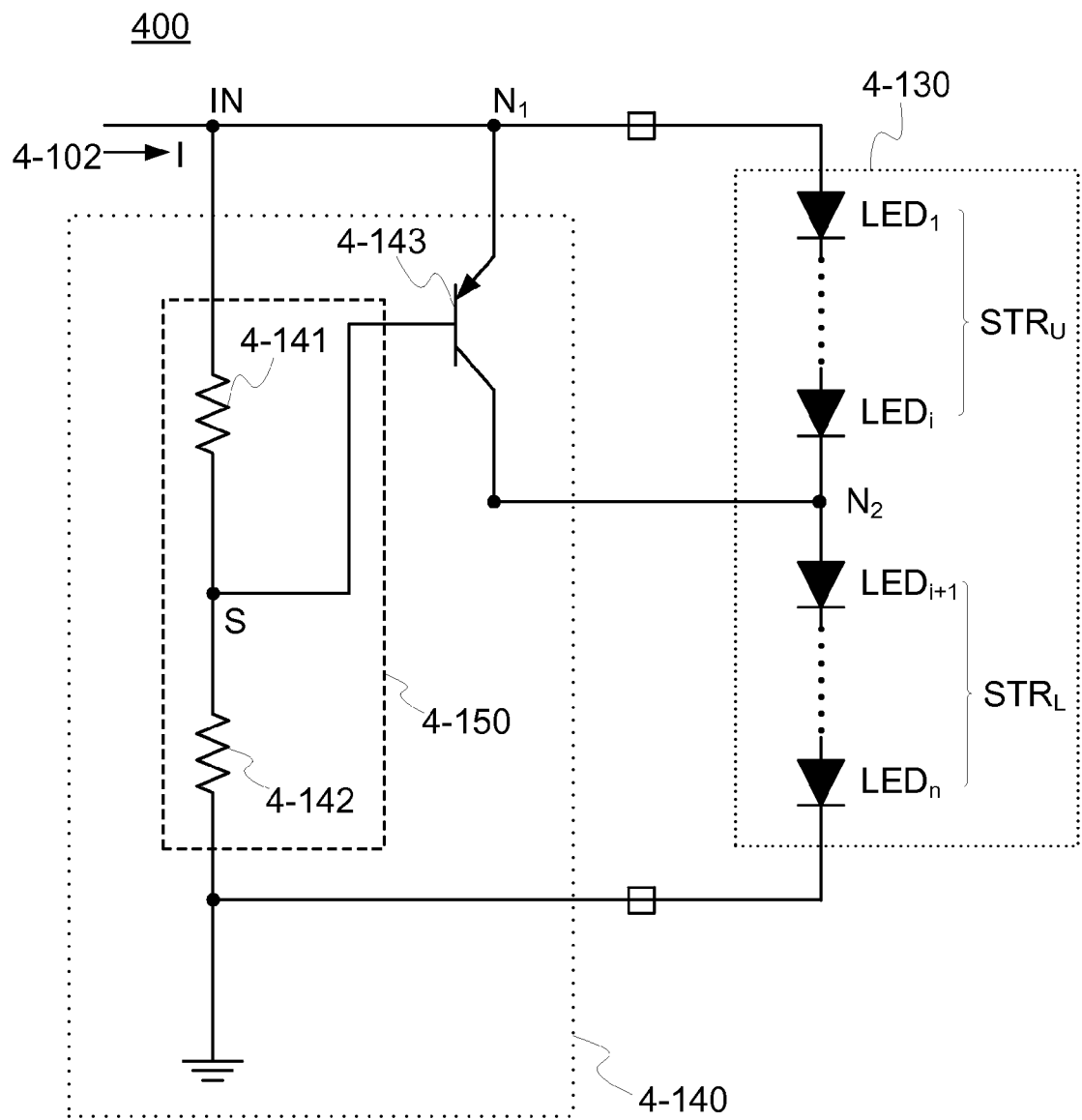
FIG. 4 is a diagram of a temperature foldback circuit and an LED string in accordance with an embodiment.

FIG. 4 is a diagram of a temperature foldback circuit 4-140 and an LED string 4-130 in accordance with an embodiment. In this embodiment, a PNP transistor is used as a switch 4-143 instead of the NPN transistor 3-143 shown in FIG. 3.

When the PNP transistor 4-143 is used, an emitter of the PNP transistor 4-143 is coupled to a first node $N_1$ between an input node and the LED string 4-130. A collector of the PNP transistor 4-143 is coupled to a second node $N_2$ between the first and second portions $STR_U$ and $STR_L$ of the LED string 4-130.

A level of the applied voltage to the base of the PNP transistor 4-143 is determined by a voltage divider including the first and second resistance elements 4-141 and 4-142. The level of the applied voltage to the base increases in proportion to a ratio of the resistance value of the second resistance element 4-142 over the total resistance value of the voltage divider including both resistance elements 4-141 and 4-142.

In an embodiment the first resistance element 4-141 has a substantially constant resistance value, and the second resistance element 4-142 is a resistor having the NTC characteristic. In this embodiment as a temperature of the resistance elements 4-141 and 4-142 increases, the resistance value of the second resistance element 4-142 is decreased while that of the first resistance element 4-141 remains constant. Since a voltage across the second resistance element 4-142 is decreased, the voltage level at an output node S that is applied to the base of the PNP transistor 4-143 is decreased. When the temperature becomes higher than the threshold temperature, the voltage level applied to the base becomes sufficiently low to turn on the PNP transistor 4-143.

In another approach, the first resistance element 4-141 is a resistor having the PTC characteristic and the second resistance element 4-142 has a substantially constant resistance value. In this embodiment, as the temperature of the resistance elements 4-141 and 4-142 increases, the resistance value of the first resistance element 4-141 is increased while that of the second resistance element 4-142 remains constant. Since a voltage across the first resistance element 4-141 is increased, the voltage level at the output node S that is applied to the base of the PNP transistor 4-143 is decreased. When the temperature becomes higher than the threshold temperature, the voltage level applied to the base becomes sufficiently low to turn on the PNP transistor 4-143.

When the PNP transistor 4-143 is turned on, the DC current 4-102 does not flow through a first portion $STR_U$ of the LED string 4-130 but bypasses through the PNP transistor 4-143 to a second portion $STR_L$ of the LED string 4-130.

Under such conditions, where the first portion $STR_U$ includes i number of LEDs ($LED_1$ to $LED_i$) and the second portion $STR_L$ includes (n–i) number of LEDs ($LED_{i+1}$ to $LED_n$), the amount of dissipated power is reduced as follows:

dissipated power after bypassing =
$$\text{dissipated power before bypassing} \times \frac{(n-i)}{n}.$$

For example, when the first portion $STR_U$ includes two LEDs and the second portion $STR_L$ includes eight LEDs, the amount of dissipated power from the LED string 4-130 after bypassing would be reduced to 80% (=100%*(10−2)/10) of that of the originally dissipated power.

Since the amount of dissipated power from the LED string 4-130 is reduced, the temperature of the LED string 4-130 is decreased. When the temperature of the LED string 4-130 becomes lower than the threshold temperature, the switch 4-143 is turned off to stop operating the temperature foldback circuit 4-140.

Figure 5:
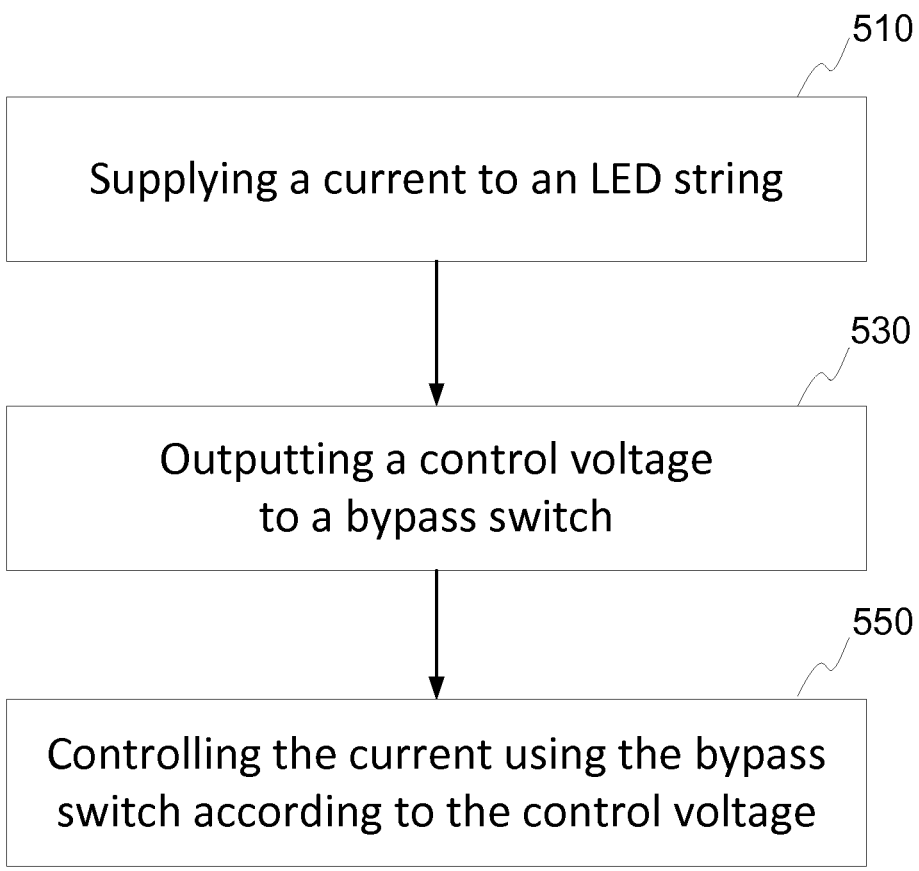
FIG. 5 is a flow diagram of a method of controlling a temperature of an LED system, in accordance with an embodiment.

FIG. 5 is a flow diagram of a method 500 of controlling a temperature of an LED system, in accordance with an embodiment. The method may be used to decrease the temperature of the LED string below a threshold temperature, thereby protecting the LED system.

At 510, a DC current is supplied from a power supply to an LED string so that LEDs included in the LED string emit light. An amount of the light emitted by the LED string may be proportional to the amount of the supplied DC current.

At 530, a control voltage is outputted from a voltage divider to a switch. When the temperature of the LED string becomes equal to or higher than the threshold temperature, the switch is turned on.

At 550, when the switch is turned on, the switch controls the DC current that has flowed through the LED string. As a result, the DC current does not flow through at least one of the LEDs included in the LED string, thereby reducing the power dissipated from the LED string.

Figure 6:
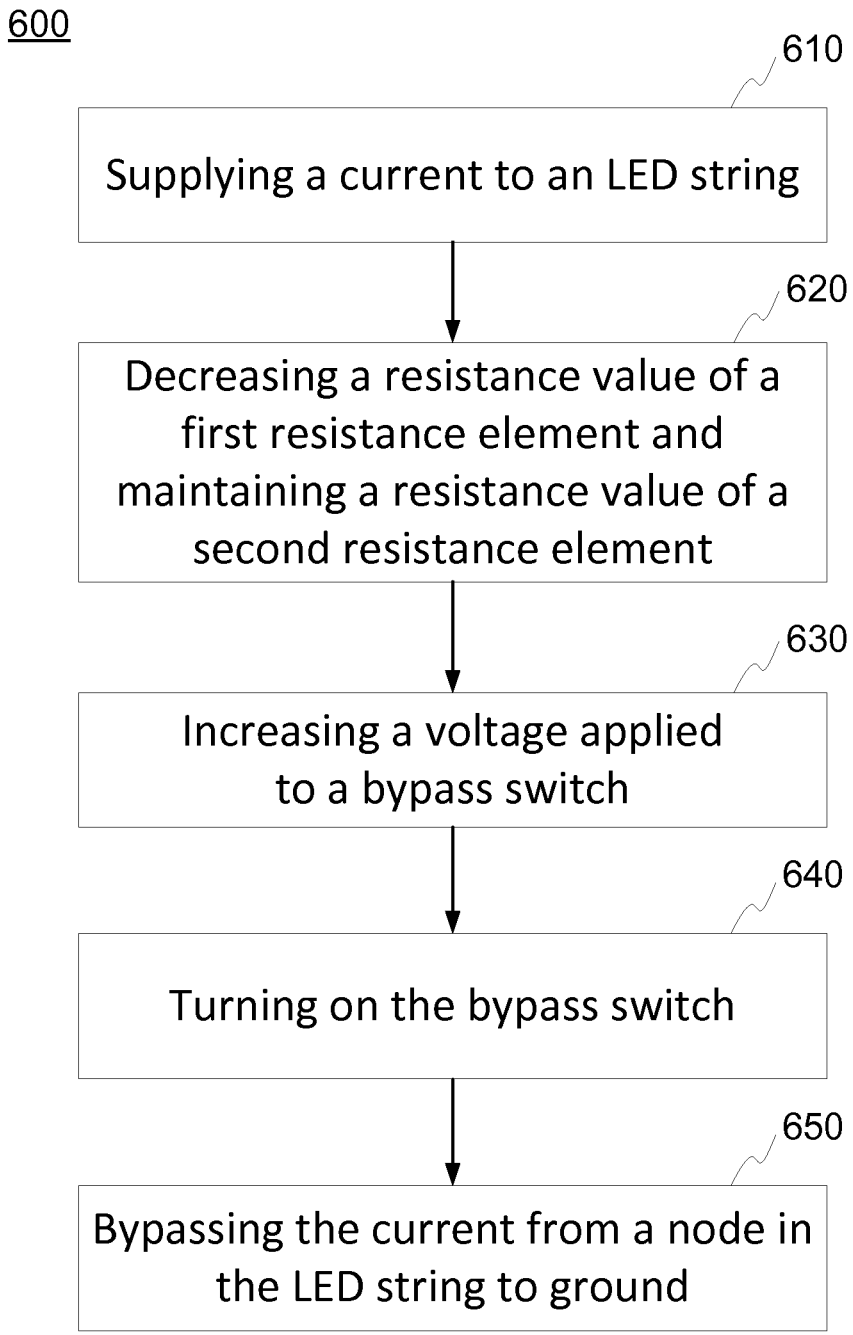
FIG. 6 is a flow diagram of a method of controlling a temperature of an LED system, in accordance with an embodiment.

FIG. 6 is a flow diagram of a method 600 of controlling a temperature of an LED system, in accordance with an embodiment. In this embodiment, an NPN transistor is used as a switch.

At 610, a DC current is supplied from a power supply to an LED string so that LEDs included in the LED string emit light. An amount of the light emitted by the LED string may be proportional to the amount of the DC current.

At 620, when a temperature of the LED string increases, a resistance value of a first resistance element having a first end coupled to an input node and a second end coupled to a base of the NPN transistor, is decreased. A resistance value of a second resistance element having a first end coupled to the base of the NPN transistor and a second end coupled to a ground, remains substantially constant. As a result, a voltage across the first resistance element is reduced.

In an embodiment, the first resistance element has the NTC characteristic and the second resistance element has a substantially constant resistance value. In another embodiment, the second resistance element has the PTC characteristic and the first resistance element has a substantially constant resistance value.

At 630, since the voltage across the first resistance element has been reduced, a voltage across the second resistance element is increased. As a result, a voltage at the output node of the voltage divider, which is applied to the base of the NPN transistor, is increased.

At 640, as the temperature of the LED string increases, the voltage applied to the base of the NPN transistor continues to increase. When the temperature of the LED string becomes equal to or higher than a threshold temperature, the voltage applied to the base becomes sufficiently high to turn on the NPN transistor.

At 650, when the NPN transistor is turned on, the DC current flows a first portion of the LED string and then bypasses from a node between the first portion and a second portion of the LED string to ground through the NPN transistor. Since the DC current does not flow through the second portion of the LED string, the power dissipated from the LED string is reduced.

Figure 7:
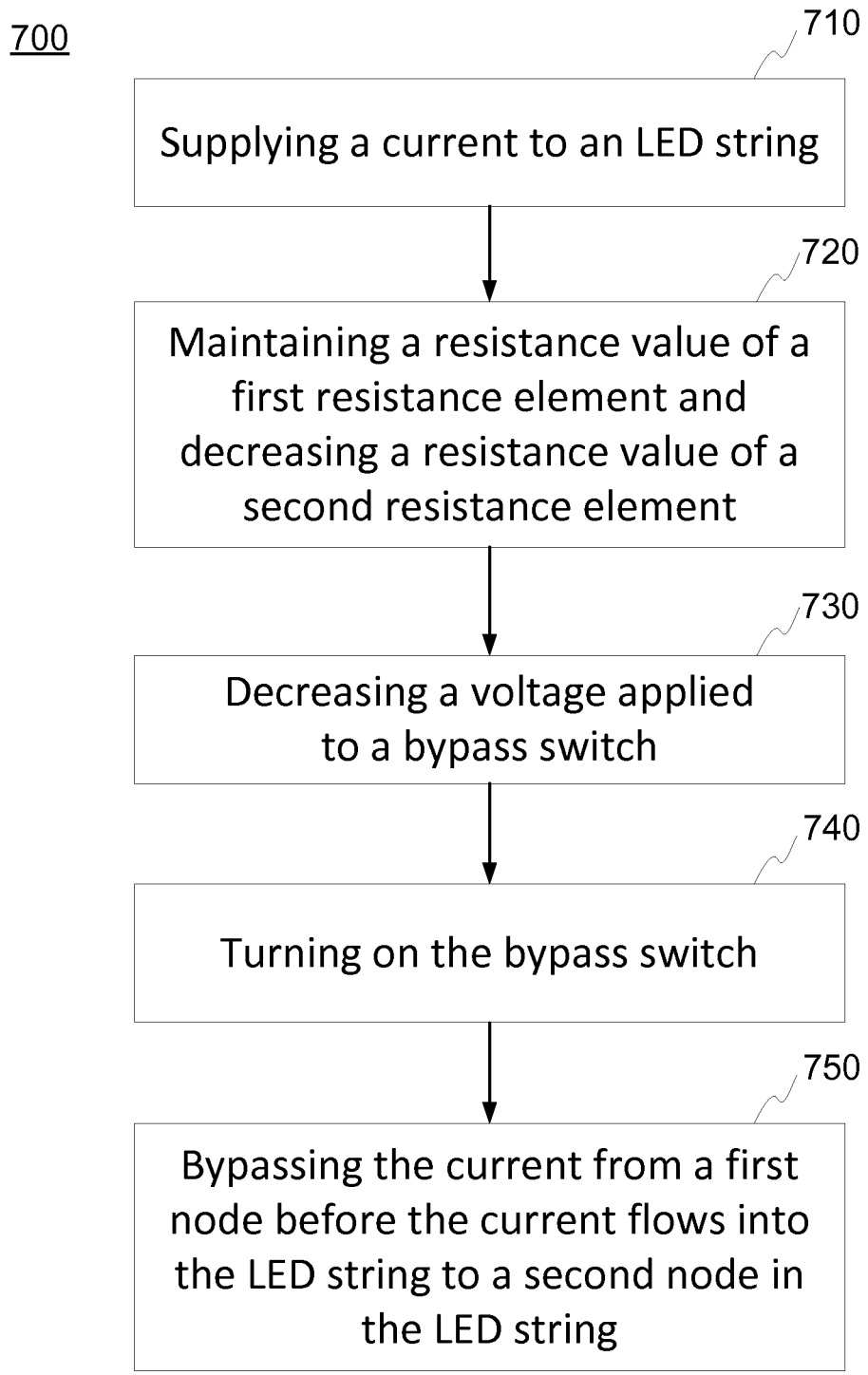
FIG. 7 is a flow diagram of a method of controlling a temperature of an LED system, in accordance with an embodiment.

FIG. 7 is a flow diagram of a method 700 of controlling a temperature of an LED string, according to an embodiment. In this embodiment, a PNP transistor is used as a switch.

At 710, a DC current is supplied from a power supply to an LED string so that LEDs included in the LED string emit light. An amount of the light emitted by the LED string may be proportional to the amount of the DC current.

At 720, when a temperature of the LED string increases, a resistance value of a first resistance element whose one end is coupled to a node between an input node and the LED string and the other end is coupled to a base of the PNP transistor remains substantially constant. A resistance value of a second resistance element having a first end coupled to the base of the PNP transistor and a second end coupled to a ground, is decreased. As a result, a voltage across the first resistance element is increased.

In an embodiment the first resistance element has a substantially constant resistance value, and the second resistance element has the NTC characteristic. In another embodiment the first resistance element has the PTC characteristic, and the second resistance element has a substantially constant resistance value.

At 730, since the voltage across the first resistance element has been increased, a voltage across the second resistance element is decreased. As a result a voltage at an output node of the voltage divider, which is applied to the base of the NPN transistor, is decreased.

At 740, as the temperature of the LED string increases the voltage applied to the base of the PNP transistor continues to decrease. When the temperature of the LED system becomes equal to or higher than a threshold temperature, the voltage applied to the base becomes sufficiently low to turn on the PNP transistor.

At 750, when the PNP transistor is turned on, the DC current does not flow a first portion of the LED string. Instead, the DC current bypasses from a first node between the input node and the LED string to a second node between the first and second portions of the LED string through the PNP transistor. Since the DC current does not flow the first portion of the LED string, the power dissipated from the LED string is reduced.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus comprising:
   an input node;
   a light-emitting diode (LED) string configured to receive a current from the input node, the LED string including a first portion and a second portion, each of the first and second portions including at least one LED;
   a voltage divider configured to output a control voltage and includes a first resistance element and a second resistance element coupled at an output node, the output node configured to output the control voltage, any one of or both of the first resistance element and the second resistance element having a temperature dependent characteristic;
   a node between the first and second portions of the LED string; and
   a switch configured to receive the control voltage output by the output node, the switch including a bipolar junction transistor (BJT) having a collector coupled to the node between the first and second portions of the LED string, an emitter directly coupled to a ground or the input node, and a base directly coupled to the output node, the switch configured to divert the current from the LED string according to the control voltage.

2. The apparatus of claim 1, wherein the switch controls the current through the LED string based on an indication of a temperature of the LED string.

3. The apparatus of claim 2, wherein the switch controls the current to reduce the temperature of the LED string.

4. The apparatus of claim 1, wherein the switch causes the current to divert from the node between the first and second portions to the ground.

5. The apparatus of claim 4, wherein:
   the switch is configured to be turned on to divert the current from the node between the first and second portions when the control voltage from the output node is equal to or higher than a threshold voltage; and
   the switch comprises an NPN transistor.

6. The apparatus of claim 5, wherein the first resistance element has a negative temperature coefficient (NTC) characteristic, and the second resistance element has a substantially constant resistance value.

7. The apparatus of claim 1, wherein the node between the first and second portions of the LED string is a first node, further comprising:
   a second node between the input node and the LED string,
   wherein the switch causes the current to divert from the second node to the first node.

8. The apparatus of claim 7 wherein:
   the switch is configured to be turned on to divert the current from the second node to the first node when the control voltage from the output node is equal to or lower than a threshold voltage; and
   the switch comprises a PNP transistor.

9. The apparatus of claim 1, wherein the switch is a PNP transistor and the first resistance element has a substantially constant resistance value and the second resistance element has an NTC characteristic.

10. A method comprising:
    supplying a current from an input node to an LED string including a first portion and a second portion, each of the first and second portions including at least one LED;
    outputting a control voltage from a voltage divider to a switch to control the switch; and
    diverting the current from the LED string according to the control voltage,
    wherein the voltage divider comprises a first resistance element and a second resistance element coupled to each other at an output node, any one of or both of the first resistance element and the second resistance element having a temperature dependent characteristic and
    wherein the switch includes a bipolar junction transistor (BJT) having a collector coupled to a node between the first and second portions of the LED string, emitter directly coupled to a ground or the input node, and a base directly coupled to the output node.

11. The method of claim 10, wherein the current through the LED string is controlled based on an indication of a temperature of the LED string.

12. The method of claim 11, wherein the current through the LED is controlled to reduce the temperature of the LED string.

13. The method of claim 11, wherein outputting the control voltage from the voltage divider to the switch comprises:
    dividing a voltage across the voltage divider according to a ratio between resistance values of the first and second resistance elements to generate the control voltage at the output node; and
    outputting the control voltage from the output node to the switch.

14. The method of claim 13, wherein controlling the current using the switch comprises:
    receiving the control voltage from the output node by the switch; and
    causing the current to divert from the node between the first and second portions of the LED string to the ground.

15. The method of claim 14, wherein:
    the current is caused to divert when the control voltage received by the switch is equal to or higher than a threshold voltage so that the switch is turned on; and
    the switch comprises an NPN transistor.

16. The method of claim 15, wherein dividing the voltage across the voltage divider comprises:
    decreasing the resistance value of the first resistance as the temperature of the LED string increases; and maintaining the resistance value of the second resistance at a substantially constant value as the temperature of the LED string increases.

17. The method of claim 13, wherein the node between the first and second portions of the LED string is a first node and controlling the current using the switch comprises:
receiving the control voltage from the output node by the switch; and
causing the current to divert from a second node between the input node and the LED string to the first node between the first and second portions of the LED string.

18. The method of claim 17, wherein:
the current is caused to divert when the control voltage received by the switch is equal to or less than a threshold voltage so that the switch is turned on; and
the switch comprises a PNP transistor.

19. The method of claim 10, wherein the switch is a PNP transistor, and
wherein dividing the voltage across the voltage divider comprises:
maintaining the resistance value of the first resistance at a substantially constant value as the temperature of the LED string increases; and
decreasing the resistance value of the second resistance as the temperature of the LED string increases.

20. The apparatus of claim 1, wherein the first resistance element is coupled to the input node and the second resistance element is coupled to the ground.

* * * * *